US012567609B2

(12) United States Patent
Park et al.

(10) Patent No.: US 12,567,609 B2
(45) Date of Patent: Mar. 3, 2026

(54) BATTERY PACK, ELECTRONIC DEVICE AND VEHICLE

(71) Applicant: LG ENERGY SOLUTION, LTD., Seoul (KR)

(72) Inventors: Chang-Wook Park, Daejeon (KR); Hyun-Jong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 532 days.

(21) Appl. No.: 18/008,366

(22) PCT Filed: Sep. 6, 2021

(86) PCT No.: PCT/KR2021/012069
§ 371 (c)(1),
(2) Date: Dec. 5, 2022

(87) PCT Pub. No.: WO2022/085937
PCT Pub. Date: Apr. 28, 2022

(65) Prior Publication Data
US 2023/0291019 A1    Sep. 14, 2023

(30) Foreign Application Priority Data

Oct. 21, 2020    (KR) ........................ 10-2020-0137094

(51) Int. Cl.
*H01M 10/48*        (2006.01)
*H01M 50/213*        (2021.01)
(Continued)

(52) U.S. Cl.
CPC ....... *H01M 10/482* (2013.01); *H01M 10/486* (2013.01); *H01M 50/213* (2021.01);
(Continued)

(58) Field of Classification Search
CPC ............. H01M 10/482; H01M 10/486; H01M 50/213; H01M 50/262; H01M 50/298;
(Continued)

(56) References Cited

U.S. PATENT DOCUMENTS

| | | | | |
|---|---|---|---|---|
| 4,857,670 A | * | 8/1989 | Frank ..................... | H02G 3/266 174/101 |
| 6,972,367 B2 | * | 12/2005 | Federspiel ........... | H02G 3/0437 174/68.3 |

(Continued)

FOREIGN PATENT DOCUMENTS

| | | |
|---|---|---|
| CN | 103098166 A | 5/2013 |
| CN | 107534108 A | 1/2018 |

(Continued)

OTHER PUBLICATIONS

KR 10-2018-0094632 machine English translation (Year: 2018).*

(Continued)

*Primary Examiner* — Michael L Dignan
(74) *Attorney, Agent, or Firm* — Morgan, Lewis & Bockius LLP

(57)    ABSTRACT

Disclosed is a battery pack for securing easy installation of sensing wires and reducing manufacturing cost. The battery pack includes a plurality of battery cells; a measuring unit configured to measure a current and temperature of at least one of the plurality of battery cells; at least one sensing wire electrically connected to the measuring unit and configured to have a wire on which a current flows; and a cell frame including a sidewall portion configured to form an inner space for accommodating the plurality of battery cells, and a fixing portion having a pillar part configured to protrude outward from the sidewall portion and a bending part bent (Continued)

and extended from the protruding end of the pillar part to form a space for accommodating the at least one sensing wire.

10 Claims, 5 Drawing Sheets

(51) Int. Cl.
 *H01M 50/262* (2021.01)
 *H01M 50/298* (2021.01)

(52) U.S. Cl.
 CPC ....... *H01M 50/262* (2021.01); *H01M 50/298* (2021.01); *H01M 2220/20* (2013.01); *H01M 2220/30* (2013.01)

(58) Field of Classification Search
 CPC ......... H01M 2220/20; H01M 2220/30; H01M 10/42; H01M 10/48; H01M 50/20; H01M 50/209; H01M 50/211; H01M 50/249; H01M 50/569; Y02E 60/10
 See application file for complete search history.

(56) References Cited

U.S. PATENT DOCUMENTS

| | | | |
|---|---|---|---|
| 9,425,452 | B2 | 8/2016 | Ogasawara et al. |
| 2003/0117807 | A1 | 6/2003 | Hur et al. |
| 2011/0064987 | A1 | 3/2011 | Ogasawara et al. |
| 2011/0097619 | A1 | 4/2011 | Park |
| 2012/0058382 | A1 | 3/2012 | Carignan et al. |
| 2012/0164509 | A1* | 6/2012 | Ogasawara ......... H01M 50/507 439/212 |
| 2014/0370342 | A1* | 12/2014 | Nakayama ............ H01M 10/48 429/90 |
| 2018/0337388 | A1 | 11/2018 | Chaen |
| 2019/0312250 | A1 | 10/2019 | Idota et al. |
| 2020/0006741 | A1 | 1/2020 | Shin et al. |
| 2020/0036049 | A1 | 1/2020 | Lee et al. |
| 2020/0058917 | A1 | 2/2020 | Sato et al. |
| 2020/0280040 | A1 | 9/2020 | Lee et al. |

FOREIGN PATENT DOCUMENTS

| | | | | |
|---|---|---|---|---|
| CN | 109863618 | A | 6/2019 | |
| CN | 110062969 | A | 7/2019 | |
| CN | 111247662 | A | 6/2020 | |
| JP | 2013-20815 | A | 1/2013 | |
| JP | 2013-105571 | A | 5/2013 | |
| JP | 2013-143214 | A | 7/2013 | |
| JP | 2014-022169 | A | 2/2014 | |
| JP | 5598725 | B2 | 10/2014 | |
| JP | 2014-233160 | * | 12/2014 | .............. H02G 3/04 |
| JP | 2016-201336 | A | 12/2016 | |
| JP | 2017-212128 | A | 11/2017 | |
| JP | 2018-206699 | A | 12/2018 | |
| KR | 10-0595304 | B1 | 7/2006 | |
| KR | 10-0994231 | B1 | 11/2010 | |
| KR | 10-1084836 | B1 | 11/2011 | |
| KR | 10-1702505 | B1 | 2/2017 | |
| KR | 10-2018-0039526 | A | 4/2018 | |
| KR | 10-2018-0094632 | * | 8/2018 | ........... H01M 10/42 |
| KR | 10-2018-0094632 | A | 8/2018 | |
| KR | 10-1879863 | B1 | 8/2018 | |
| KR | 10-2019-0112468 | A | 10/2019 | |
| KR | 10-2047483 | B1 | 12/2019 | |
| KR | 10-2117318 | B1 | 6/2020 | |

OTHER PUBLICATIONS

JP 2014-233160 machine English translation (Year: 2014).*

Office Action issued in corresponding Japanese Patent Application No. 2022-565909, dated Oct. 23, 2023.

Office Action dated Jan. 8, 2025 issued in corresponding Taiwanese Patent Application No. 110138857. (Note: JP 2013-20815 A previously filed in prior IDS.).

Extended European Search Report dated Jan. 3, 2025 issued in corresponding European Patent Application No. 21883010.7.

International Search Report (with partial translation) and Written Opinion dated Jan. 3, 2022, for corresponding International Patent Application No. PCT/KR2021/012069.

Office Action dated Jul. 4, 2025 issued in corresponding Korean Patent Application No. 10-2020-0137094. (Note: JP 2013-020815 A already submitted.).

Office Action dated Oct. 31, 2025 issued in corresponding Chinese Patent Application No. 202180035767.6. (Note: KR 10-2018-0039526 A, KR 10-2019-0112468 A and JP 2016-201336 A were previously cited.).

* cited by examiner

<u>100</u>

BATTERY PACK, ELECTRONIC DEVICE AND VEHICLE

TECHNICAL FIELD

The present application claims priority to Korean Patent Application No. 10-2020-0137094 filed on Oct. 21, 2020 in the Republic of Korea, the disclosures of which are incorporated herein by reference.

The present disclosure relates to a battery pack, an electronic device, and a vehicle, and more particularly, to a battery pack for securing easy installation of sensing wires and reducing manufacturing cost.

BACKGROUND ART

Recently, with the rapid increase in demand for portable electronic products such as laptop computers, video cameras, and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

This lithium secondary battery mainly uses lithium-based oxide and carbon material as a positive electrode active material and a negative electrode active material, respectively. In addition, this lithium secondary battery includes an electrode assembly in which a positive electrode plate and a negative electrode plate respectively coated with the positive electrode active material and the negative electrode active material are disposed with a separator interposed therebetween, and an exterior, namely a battery case, for hermetically accommodating the electrode assembly together with an electrolyte.

In addition, depending on the shape of the exterior, lithium secondary batteries may be classified into a can-type battery cell in which the electrode assembly is included in a metal can and a pouch-type battery cell in which the electrode assembly is included in a pouch made of an aluminum laminate sheet.

Here, in case of the can-type battery cell, the metal can in which the electrode assembly is included may be made in a cylindrical shape. The can-type battery cell may be used to construct a battery pack. For example, the battery pack may include a plurality of can-type battery cells, a cell frame for accommodating the battery cells, and a bus bar or a metal plate configured to electrically connect the plurality of battery cells.

Meanwhile, the battery pack of the prior art basically measures the current and temperature changes according to the charging and discharging of a plurality of battery cells in order to determine the battery operating state or battery life. The battery pack of the prior art uses a current sensing wire to measure the current of a plurality of battery cells, and a temperature sensing wire to measure the temperature. At this time, in the battery pack of the prior art, the current sensing wire and the temperature sensing wire are fixed to the outer surface of the cell frame by using a double-sided tape.

However, in the prior art, if the double-sided tape is used to prevent the movement of the sensing wires, first, the double-sided tape should be installed to surround the sensing wires, and then a release paper should be removed from the double-sided tape for adhesion with the cell frame. In this way, the work for fixing the sensing wires by using double-sided tape is cumbersome, thereby increasing the processing time and increasing the manufacturing cost.

DISCLOSURE

Technical Problem

The present disclosure is designed to solve the problems of the related art, and therefore the present disclosure is directed to providing a battery pack for securing easy installation of sensing wires and reducing manufacturing cost.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:

a plurality of battery cells;

a measuring unit configured to measure a current and temperature of at least one of the plurality of battery cells;

at least one sensing wire electrically connected to the measuring unit and configured to have a wire on which a current flows; and a cell frame including a sidewall portion configured to form an inner space for accommodating the plurality of battery cells, and a fixing portion having a pillar part configured to protrude outward from the sidewall portion and a bending part bent and extended from the protruding end of the pillar part to form a space for accommodating the at least one sensing wire.

Also, the fixing portion may include:

a first fixing portion having a first pillar part located at one side with respect to the sensing wire and configured to protrude outward from the sidewall portion, and a first bending part bent and extended from the protruding end of the first pillar part to surround the sensing wire; and a second fixing portion having a second pillar part located at the other side with respect to the sensing wire and configured to protrude outward from the sidewall portion, and a second bending part bent and extended from the protruding end of the second pillar part and located to face the first bending part to be spaced apart from the first bending part by a predetermined distance.

Moreover, the second pillar part may be spaced apart from an end of the first bending part by a predetermined distance.

In addition, the first bending part may further include a pressing protrusion on one surface thereof facing the sensing wire.

Further, the sidewall portion may further include a fixing protrusion configured to protrude toward the sensing wire.

Also, the battery pack may further comprise a guide portion configured to protrude toward the sensing wire from the second pillar part of the second fixing portion and have an inclined surface so that a length of the guide portion protruding from the sidewall portion gradually decreases as being closer to the sensing wire.

Moreover, at least one of the first pillar part and the second pillar part may include a reinforcing rib configured to extend to the sidewall portion.

In addition, the fixing portion may include a hook configured to extend from an end of the bending part to surround one side portion of the sensing wire.

Further, in another aspect of the present disclosure, there is also provided an electronic device, comprising at least one battery pack.

Also, in another aspect of the present disclosure, there is also provided a vehicle, comprising at least one battery pack.

Advantageous Effects

According to an embodiment of the present disclosure, the battery pack of the present disclosure includes a fixing portion having a space for accommodating at least one wire, and thus it is possible to accommodate and fix the wire in the cell frame even without using an adhesive tape (double-sided tape), unlike the battery pack of the prior art. Thus, the process of manually attaching the wire to the outer surface of the cell frame by using an adhesive tape may be omitted, thereby effectively reducing the manufacturing cost and the manufacturing process time.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
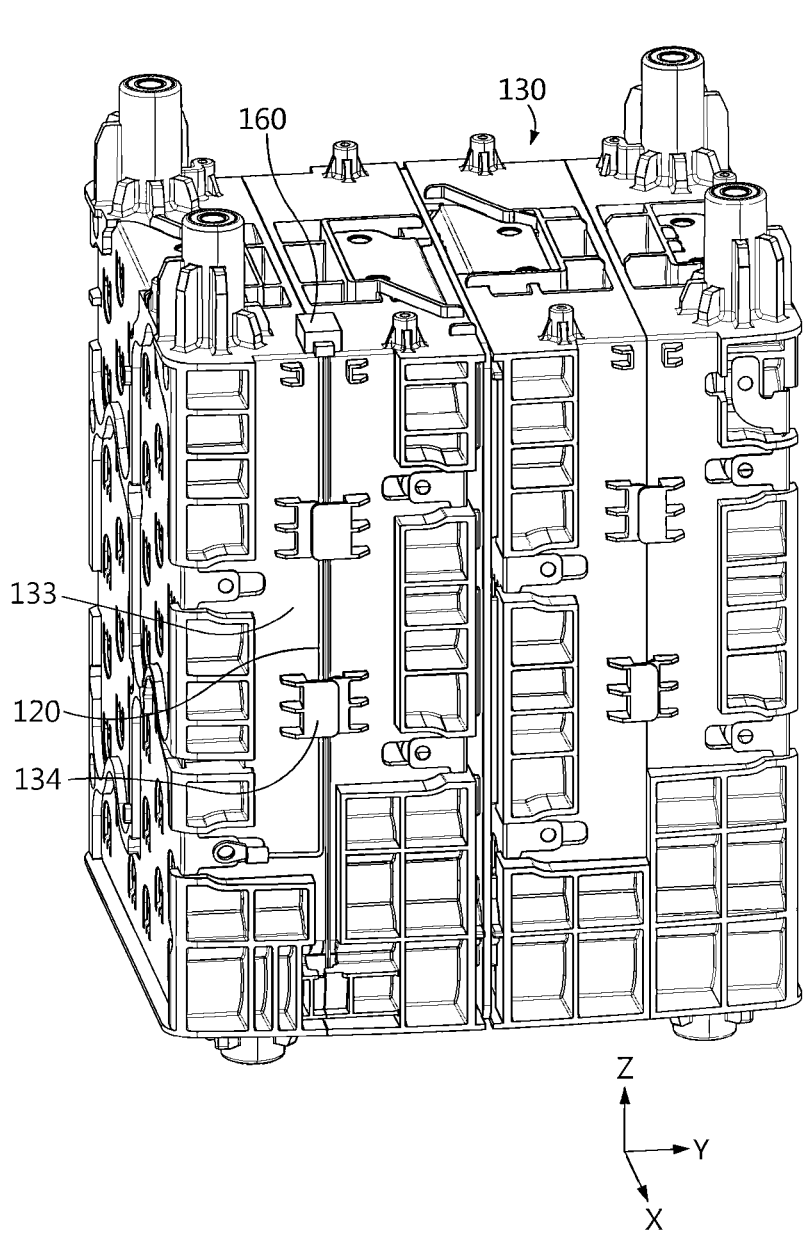
FIG. 1 is a perspective view schematically showing a battery pack according to the first embodiment of the present disclosure.

FIG. 1 is a perspective view schematically showing a battery pack according to the first embodiment of the present disclosure. Also, FIG. 2 is an exploded perspective view schematically showing components of the battery pack according to the first embodiment of the present disclosure.

Figure 2:
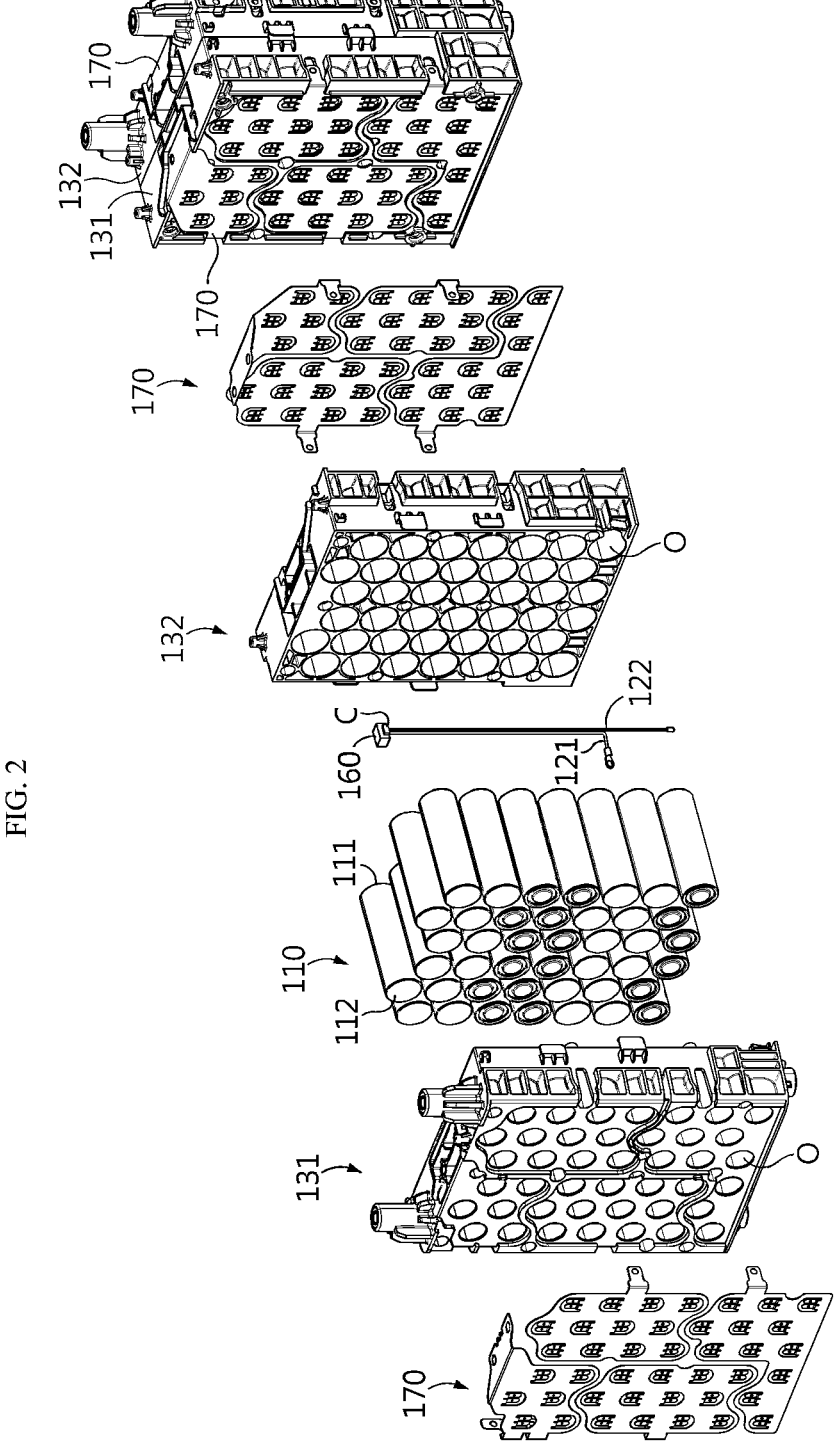
FIG. 2 is an exploded perspective view schematically showing components of the battery pack according to the first embodiment of the present disclosure.
Figure 3:
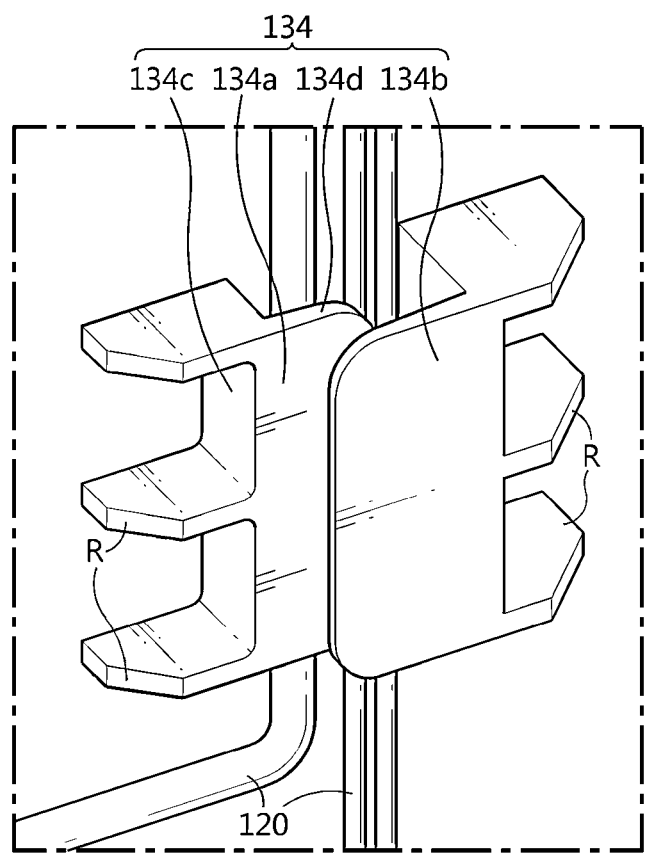
FIG. 3 is a partial perspective enlarged view showing a fixing portion of FIG. 1.

Referring to FIGS. 1 to 3, the battery pack 100 according to the first embodiment of the present disclosure includes a plurality of battery cells 110, a measuring unit 160, at least one sensing wire 120, and a cell frame 130.

First, each of the plurality of battery cells 110 may be a rechargeable lithium secondary battery. The battery cell 110 may be a can-type battery cell 110. The battery cell 110 may include a positive electrode terminal 111 and a negative electrode terminal 112 at one end and the other end thereof, respectively. The battery cell 110 may include a cylindrical can.

The configuration of the battery cell 110 is widely known to those skilled in the art at the time of filing of this application and thus will not be described in detail here. In addition, although an example of the battery cell 110 is illustrated in FIG. 3, the battery pack 100 according to the present disclosure is not limited to the configuration of the battery cell 110 having a specific shape. That is, various types of battery cells 110 known at the time of filing of this application may be employed in the battery pack 100 according to the present disclosure.

In addition, the battery pack 100 of the present disclosure may further include a plurality of metal plates 170. The metal plate 170 may be configured to electrically connect the plurality of cylindrical battery cells 110. The metal plate 170 may include a conductive metal. The metal plate 170 may include, for example, at least one of copper, nickel, and aluminum.

Moreover, the metal plate 170 may be mounted to a left side or a right side of the cell frame 130. For example, as shown in FIG. 2, four metal plates 170 may be mounted at the right side of the battery pack 100.

In addition, the measuring unit 160 may be configured to measure a current and temperature of at least one of the plurality of battery cells 110.

Further, the at least one sensing wire 120 may include a current sensing wire 121 for sensing a current of the plurality of battery cells 110 and a temperature sensing wire 122 for sensing a temperature of the plurality of battery cells 110. The current sensing wire 121 may be configured to transmit the current of at least one of the plurality of battery cells 110 to the measuring unit 160. The current sensing wire 121 may include a wire electrically connected to at least some of the plurality of battery cells 110. The current sensing wire 121 may be configured to contact a portion of the metal plate 170 through a ring terminal provided at an end thereof.

In addition, the temperature sensing wire 122 may be configured to measure the temperature of at least some of the plurality of battery cells 110. For example, a thermistor may be provided at a lower end of the temperature sensing wire 122. Accordingly, the measuring unit 160 may be configured to calculate the temperature of the battery cell 110 through the electrical signal received from the thermistor.

Moreover, the measuring unit 160 may have a connector C configured to connect with the current sensing wire 121 and the temperature sensing wire 122. The measuring unit 160 may be configured to calculate the temperature of the battery cell 110 through the electrical signal received from the current sensing wire 122. The measuring unit 160 may be configured to calculate the current intensity of the battery cell 110 through the current transmitted from the current sensing wire 121.

In addition, the cell frame 130 may have an electrically insulating material. For example, the cell frame 130 may include polyvinyl chloride. The cell frame 130 may include a sidewall portion 133. The sidewall portion 133 may be configured to form an inner space that accommodates the plurality of battery cells 110. For example, as shown in FIG. 1, the sidewall portion 133 may include a front wall positioned in the front, a rear wall positioned in the rear, a left wall positioned on the left, and a right wall positioned on the right. In addition, the cell frame 130 may include an upper wall for covering the upper portion of the plurality of battery cells 110 and a lower wall for covering the lower portion of the plurality of battery cells 110. For reference, the positive direction of the X-axis and the negative direction of the X-axis indicated in FIG. 1 of the present disclosure may refer to a right direction and a left direction. The positive direction of the Y-axis and the negative direction of the Y-axis may refer to a rear direction and a front direction. The positive direction of the Z axis and the negative direction of the Z axis may refer to an upper direction and a lower direction.

Moreover, the cell frame 130 may have a box-shaped body as a whole. In addition, the cell frame 130 may have a plurality of hollows O in the body thereof to accommodate the plurality of battery cells 110 therein. For example, the cell frame 130 may have a plurality of cylindrical hollows O, as shown in FIG. 2.

In addition, the cell frame 130 may include a first frame 131 and a second frame 132 that form a space for accommodating the plurality of cylindrical battery cells 110. The first frame 131 may be configured to have a rear end coupled to a front end of the second frame 132. In this case, the coupling method may be, for example, bolting.

FIG. 3 is a partial perspective enlarged view showing a fixing portion of FIG. 1.

Moreover, the cell frame 130 may include a fixing portion 134. The fixing portion 134 may include a pillar part 134c and the bending part 134d. The pillar part 134c may have a shape protruding outward from the sidewall portion 133. For example, as shown in FIG. 3, the pillar part 134c may have a shape extending in the right direction from the right wall of the cell frame 130.

Also, the bending part 134d may be bent and extended from the protruding end of the pillar part 134c. For example, as shown in FIG. 3, the bending part 134d may have a shape extending forward or downward from the right wall of the cell frame 130. The bending part 134d may be configured to form a space for accommodating the at least one sensing wire 120. For example, as shown in FIG. 3, three sensing wires 120 may be positioned inside the bending part 134d. Here, the term 'inside' means an area in which the plurality of cylindrical battery cells 110 accommodated in the cell frame 130 are located. Further, the bending part 134d may prevent the at least one sensing wire 120 accommodated in the inside from being separated to the outside again due to its shape feature.

Therefore, according to this configuration of the present disclosure, since the present disclosure includes the fixing portion 134 having a space for accommodating the at least one sensing wire 120, unlike the battery pack 100 of the prior art, the sensing wire 120 may be accommodated in and fixed to the cell frame 130 without using an adhesive tape. Thus, the process for a worker to manually attach the sensing wire 120 to the outer surface of the cell frame 130 using an adhesive tape may be omitted, thereby effectively reducing the manufacturing cost and the manufacturing process time.

Figure 4:
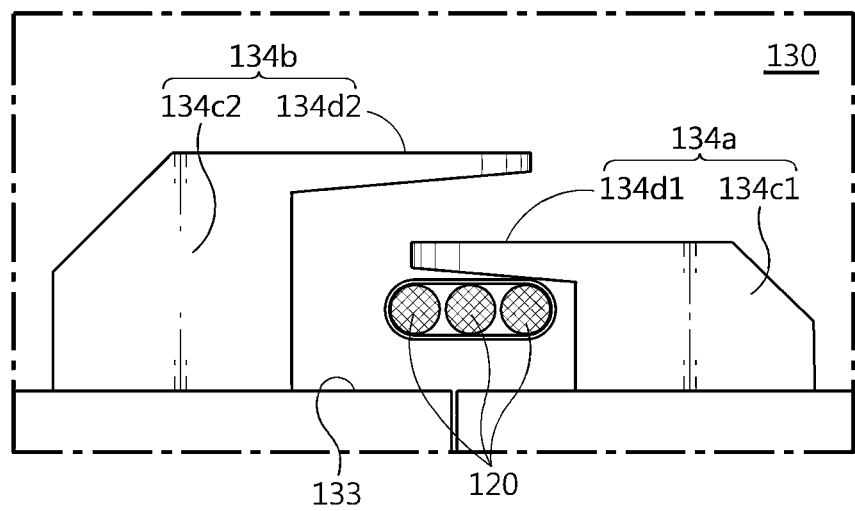
FIG. 4 is a sectional view schematically showing the fixing portion of FIG. 3.

FIG. 4 is a sectional view schematically showing the fixing portion of FIG. 3. In FIG. 4, a part of the battery pack is cut in the horizontal direction and viewed downward from the top.

Referring to FIG. 4 along with FIG. 3, the fixing portion 134 of the battery pack 100 according to an embodiment of the present disclosure may include a first fixing portion 134a and a second fixing portion 134b.

First, the first fixing portion 134a may be positioned at one side with respect to the sensing wire 120. For example, the first fixing portion 134a may be positioned in front of the sensing wire 120. The first fixing portion 134a may include a first pillar part 134c1 and a first bending part 134d1. The first pillar part 134c1 may protrude outward from the sidewall portion 133. For example, as shown in FIG. 4, the first pillar part 134c1 may be provided to the sidewall portion 133 and may have a shape extending in the right direction from the sidewall portion 133.

Also, the first bending part 134d1 may be a portion bent and extended from the protruding end of the first pillar part 134c1. The first bending part 134d1 may have a bent shape to surround a portion of the sensing wire 120. The bending direction of the first bending part 134d1 may be a rearward direction (a positive direction of the Y-axis). For example, as shown in FIG. 4, the first fixing portion 134a may be provided to the first frame 131.

Moreover, the second fixing portion 134b may be located at the other side with respect to the sensing wire 120. For example, the second fixing portion 134b may be positioned in front of the sensing wire 120. The second fixing portion 134b may include a second pillar part 134c2 and a second bending part 134d2. The second pillar part 134c2 may protrude outward from the sidewall portion 133. For example, as shown in FIG. 4, the second pillar part 134c2 may be provided to the sidewall portion 133 and may have a shape extending in the right direction from the sidewall portion 133.

Also, the second bending part 134d2 may be a portion bent and extended from the protruding end of the second pillar part 134c2. The second bending part 134d2 may have a bent shape to cover a portion of the sensing wire 120. The bending direction of the second bending part 134d2 may be a forward direction (a negative direction of the Y-axis). For example, as shown in FIG. 4, the second fixing portion 134b may be provided to the second frame 132.

Further, the second bending part 134d2 may be positioned to face the first bending part 134d1. The second bending part 134d2 may be positioned to be spaced apart from the first bending part 134d1 by a predetermined distance in an outer direction. The size of the space in which the first bending part 134d1 and the second bending part 134d2 are spaced apart from each other may be greater than the thickness of the sensing wire 120.

In addition, the second pillar part 134c2 may be spaced apart from the end of the first bending part 134d1 by a predetermined distance. For example, as shown in FIG. 4, the second pillar part 134c2 may be spaced apart from the end of the first bending part 134d1 in the front and rear direction (Y direction). In this case, the size of the separated space may be equal to or greater than the thickness of the sensing wire 120.

Therefore, according to this configuration of the present disclosure, since the present disclosure includes the first fixing portion 134a and the second fixing portion 134b, it is possible to doubly cover and protect a portion of the sensing wire 120 from the outside. Thus, when an external impact is applied to the battery pack 100, it is possible to protect the sensing wire 120 from being damaged by external objects. Moreover, in the present disclosure, by moving the sensing wire 120 through the separated space of the first fixing portion 134a and the second fixing portion 134b, the sensing wire 120 may be safely accommodated at the inside of the first bending part 134d1 of the first fixing portion 134a. Further, in the present disclosure, since the sensing wire 120 accommodated inside the first bending part 134d1 of the first fixing portion 134a is not easily separated to the outside due to a zigzag-shaped moving space formed by the first fixing portion 134a and the second fixing portion 134b, the sensing wire 120 may stably maintain its position fixed inside the first fixing portion 134a.

Figure 5:
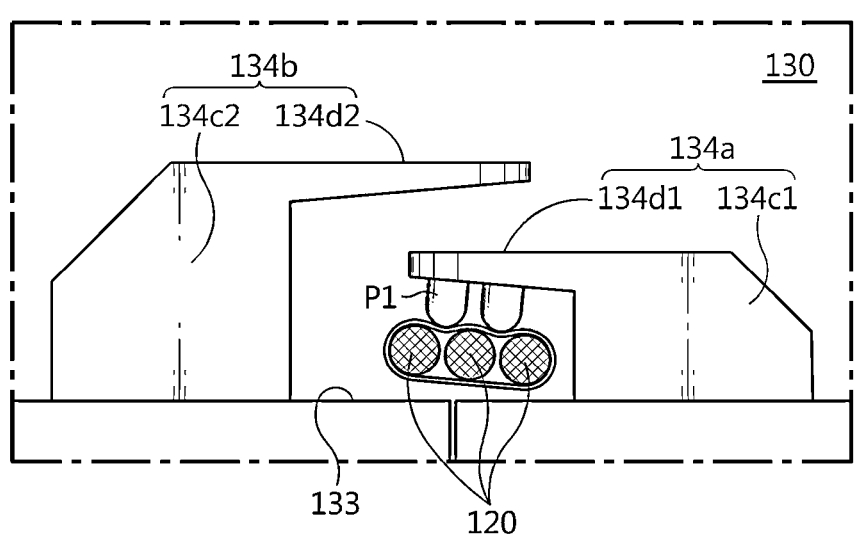
FIG. 5 is a sectional view corresponding to FIG. 4 and schematically showing a fixing portion of a battery pack according to the second embodiment of the present disclosure.

FIG. 5 is a sectional view corresponding to FIG. 4 and schematically showing a fixing portion of a battery pack according to the second embodiment of the present disclosure.

Referring to FIG. 5, the first fixing portion 134a of the battery pack 100 according to the second embodiment of the present disclosure may further include a pressing protrusion P1, compared with the first fixing portion 134a of FIG. 4. Specifically, the pressing protrusion P1 may be formed on one surface of the first bending part 134d1 facing the sensing wire 120. The pressing protrusion P1 may be configured to press the sensing wire 120 located inside the first bending part 134d1 toward the sidewall portion 133. That is, the pressing protrusion P1 may be configured to fix the position of the sensing wire 120 accommodated inside the first bending part 134d1.

Therefore, according to this configuration of the present disclosure, since the present disclosure further includes the pressing protrusion P1 on one surface of the first bending part 134d1, the sensing wire 120 may stably maintain its fixed state inside the first fixing portion 134a. Accordingly, in the present disclosure, the sensing wire 120 may be fixed to the cell frame 130 without a separate fixing member such as an adhesive tape, thereby shortening the manufacturing process of the battery pack 100 and reducing the manufacturing cost.

Figure 6:
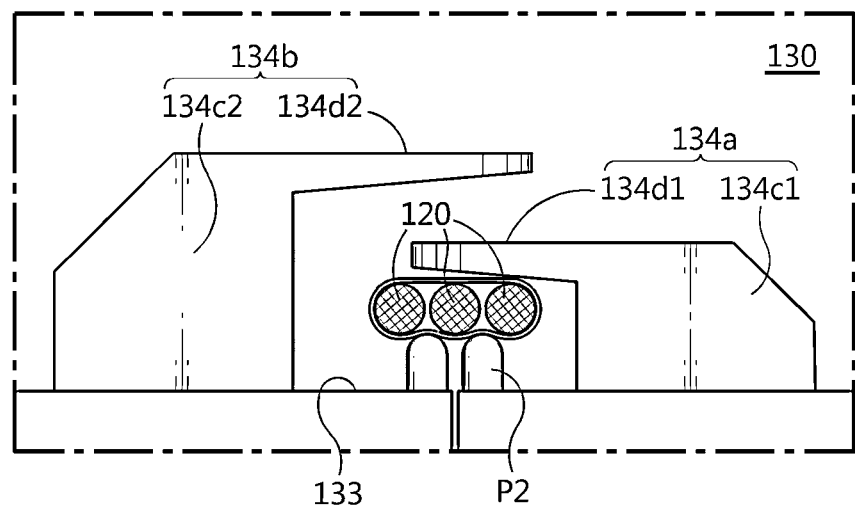
FIG. 6 is a sectional view corresponding to FIG. 4 and schematically showing a fixing portion of a battery pack according to the third embodiment of the present disclosure.

FIG. 6 is a sectional view corresponding to FIG. 4 and schematically showing a fixing portion of a battery pack according to the third embodiment of the present disclosure.

Referring to FIG. 6, the battery pack 100 according to the third embodiment of the present disclosure may further include a fixing protrusion P2 at the sidewall portion 133 of the cell frame 130, compared with the battery pack 100 of FIG. 4. Specifically, the fixing protrusion P2 may be formed on one surface of the sidewall portion 133 facing the sensing wire 120. The fixing protrusion P2 may be configured to press the sensing wire 120 located inside the first fixing portion 134a toward the first bending part 134d1. That is, the fixing protrusion P2 may be configured to fix the position of the sensing wire 120 accommodated inside the first fixing portion 134a.

Therefore, according to this configuration of the present disclosure, since the present disclosure further includes the fixing protrusion P2 on one surface of the sidewall portion 133, the sensing wire 120 may stably maintain its fixed state inside the first fixing portion 134a. Accordingly, in the present disclosure, the sensing wire 120 may be fixed to the cell frame 130 without a separate fixing member such as an adhesive tape, thereby shortening the manufacturing process of the battery pack 100 and reducing the manufacturing cost.

Figure 7:
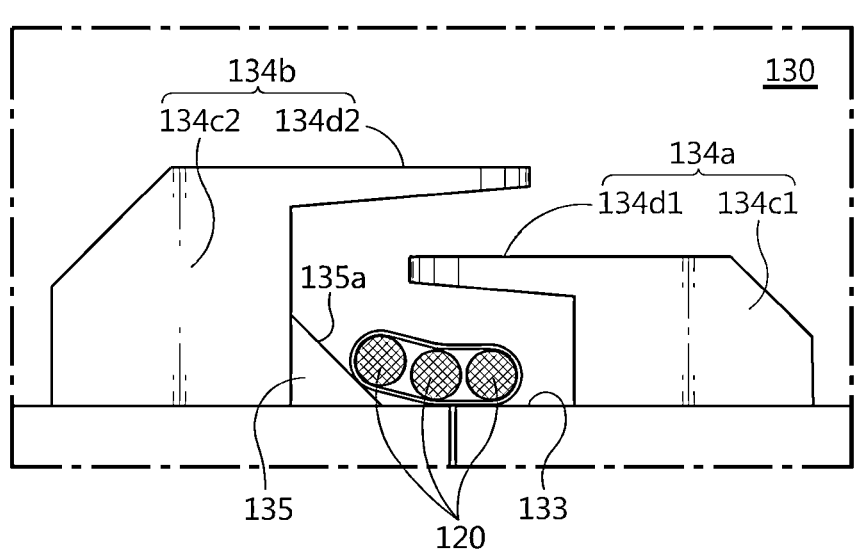
FIG. 7 is a sectional view corresponding to FIG. 4 and schematically showing a fixing portion of a battery pack according to the fourth embodiment of the present disclosure.

FIG. 7 is a sectional view corresponding to FIG. 4 and schematically showing a fixing portion of a battery pack according to the fourth embodiment of the present disclosure.

Referring to FIG. 7, the battery pack 100 according to the fourth embodiment of the present disclosure may further include a guide portion 135, compared with the battery pack 100 of FIG. 4. Specifically, the guide portion 135 may protrude toward the sensing wire 120 from the second pillar part 134c2 of the second fixing portion 134b. For example, the guide portion 135 may be a portion protruding forward from the inner surface of the second fixing portion 134b. The guide portion 135 may have an inclined surface 135a whose length protruding from the sidewall portion 133 gradually decreases as being closer to the sensing wire 120. That is, the guide portion 135 may have the shape of a triangular block with the inclined surface 135a. The inclined surface 135a may be configured to be gradually closer to the sidewall portion 133 toward the front.

Therefore, according to this configuration of the present disclosure, since the present disclosure includes the guide portion 135 having the inclined surface 135a on the second fixing portion 134b, when the sensing wire 120 is moved to the inside of the first fixing portion 134a, the sensing wire 120 may be easily fixed in place along the inclined surface 135a of the guide portion 135. Moreover, in the present disclosure, the guide portion 135 may prevent the sensing wire 120 located inside the first fixing portion 134a from being moved in the front and rear direction. Accordingly, according to the present disclosure, the sensing wire 120 may stably maintain a fixed state inside the first fixing portion 134a.

Meanwhile, referring to FIG. 3 again, the fixing portion 134 of the battery pack 100 according to the first embodiment of the present disclosure may include a reinforcing rib R. The reinforcing rib R may be provided to at least one of the first pillar part 134c1 and the second pillar part 134c2. For example, as shown in FIG. 3, the reinforcing rib R may be provided to the first pillar part 134c1 and the second pillar part 134c2. The reinforcing rib R may extend forward from the first pillar part 134c1 to the sidewall portion 133. The reinforcing rib R may extend rearward from the second pillar part 134c2 to the sidewall portion 133.

Therefore, according to this configuration of the present disclosure, since the present disclosure includes the reinforcing rib R provided to the fixing portion 134, when the fixing portion 134 collides with an external object, the fixing portion 134 may not be easily damaged due to the reinforcing rib R. Accordingly, the battery pack 100 of the present disclosure may effectively increase the durability of the cell frame 130.

Figure 8:
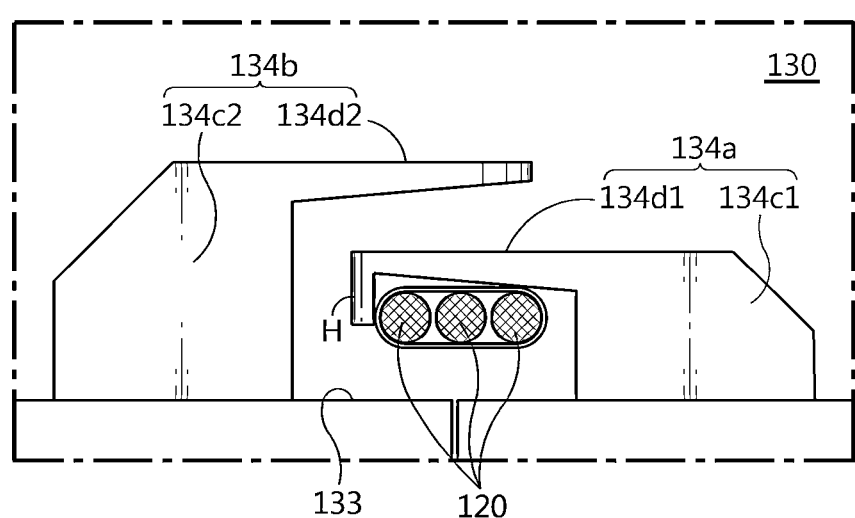
FIG. 8 is a sectional view corresponding to FIG. 4 and schematically showing a fixing portion of a battery pack according to the fifth embodiment of the present disclosure.

FIG. 8 is a sectional view corresponding to FIG. 4 and schematically showing a fixing portion of a battery pack according to the fifth embodiment of the present disclosure.

Referring to FIG. 8, the fixing portion 134 of the battery pack 100 according to the fifth embodiment of the present disclosure may further include a hook H, compared with the fixing portion 134 of FIG. 4. Specifically, the fixing portion 134 of the battery pack 100 according to the fifth embodiment of the present disclosure may include a pillar part 134c and a bending part 134d, like the fixing portion 134 of FIG. 3. The hook H may be formed to extend from the end of the bending part 134d. The hook H may have a bent shape to cover one side of the sensing wire 120. That is, the hook H may be configured to prevent the sensing wire 120 located inside the fixing portion 134 from escaping from the fixing portion 134 to the outside again.

Therefore, according to this configuration of the present disclosure, since the present disclosure further includes the hook H provided to the fixing portion 134, it is possible to more stably fix the sensing wire 120 located inside the fixing portion 134.

Meanwhile, the battery pack 100 according to an embodiment of the present disclosure further includes various devices (not shown) for controlling the charging and discharging of the battery pack 100, for example, a BMS (Battery Management System), a current sensor, and a fuse.

Meanwhile, an electronic device (not shown) according to an embodiment of the present disclosure includes at least one battery packs 100 described above. The electronic device may further include a device housing (not shown) having an accommodation space for accommodating the battery pack 100 and a display unit through which a user may check the state of charge of the battery pack 100.

In addition, at least one battery pack 100 according to an embodiment of the present disclosure may be included in a vehicle such as an electric vehicle or a hybrid electric vehicle. That is, the battery pack 100 according to an embodiment of the present disclosure as described above may be mounted in a vehicle body of the vehicle according to an embodiment of the present disclosure.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

Heretofore, embodiments and experimental examples has been described in detail to describe the present disclosure more specifically, but the present disclosure is not limited by these embodiments and experimental examples. The embodiments according to the present disclosure may be modified in various other forms, and the scope of the present disclosure should not be construed as being limited to the embodiments described above. The embodiments of the present disclosure are provided to more fully explain the present disclosure to those skilled in the art.

What is claimed is:

1. A battery pack, comprising:
a plurality of battery cells;
a measuring unit configured to measure a current and temperature of at least one of the plurality of battery cells;
at least one sensing wire electrically connected to the measuring unit and including a wire configured for a current to flow; and
a cell frame including:
a sidewall portion configured to form an inner space for accommodating the plurality of battery cells; and
a fixing portion, wherein the fixing portion includes a first fixing portion and a second fixing portion,
wherein the first fixing portion includes:
a first pillar part located at one side with respect to the at least one sensing wire and configured to protrude outward from the sidewall portion; and
a first bending part bent and extended from a protruding end of the first pillar part to accommodate the at least one sensing wire,
wherein the second fixing portion includes:
a second pillar part located at another side with respect to the at least one sensing wire and configured to protrude outward from the sidewall portion; and
a second bending part bent and extended from a protruding end of the second pillar part and located to face the first bending part to be spaced apart from the first bending part by a predetermined distance,
wherein the first bending part and the second bending part overlap each other along a direction extending outward from the sidewall portion,
wherein the cell frame includes a first frame and a second frame,
wherein the first frame includes a first sidewall portion and the first fixing portion,
wherein the second frame includes a second sidewall portion and the second fixing portion,
wherein the sidewall portion is provided by the first sidewall portion and the second sidewall portion,
wherein the first fixing portion is attached to the first frame, and
wherein the second fixing portion is attached to the second frame different from the first frame.

2. The battery pack according to claim 1,
wherein the second pillar part is spaced apart from an end of the first bending part by a predetermined distance.

3. The battery pack according to claim 1,
wherein the first bending part includes a pressing protrusion on one surface thereof facing the at least one sensing wire.

4. The battery pack according to claim 1,
wherein the sidewall portion further includes a fixing protrusion configured to protrude toward the at least one sensing wire.

5. The battery pack according to claim 1, further comprising:
a guide portion configured to protrude toward the at least one sensing wire from the second pillar part of the second fixing portion and have an inclined surface so that a length of the guide portion protruding from the sidewall portion gradually decreases as being closer to the at least one sensing wire.

6. The battery pack according to claim 1,
wherein at least one of the first pillar part and the second pillar part includes a reinforcing rib configured to extend to the sidewall portion.

7. The battery pack according to claim 1,
wherein the first fixing portion includes a hook configured to extend from an end of the first bending part to accommodate one side portion of the at least one sensing wire.

8. An electronic device, comprising the battery pack according to claim 1.

9. A vehicle, comprising the battery pack according to claim 1.

10. The battery pack according to claim 1, wherein the first fixing portion and the second fixing portion form a zigzag-shaped moving space along the direction extending outward from the sidewall portion, to move the at least one sensing wire in or out of the zigzag-shaped moving space.

\* \* \* \* \*